United States Patent

Rhodes

[11] 3,978,701
[45] Sept. 7, 1976

[54] POWER ROLL MILL GUARDING DEVICE
[75] Inventor: Charles W. Rhodes, Victoria, Tex.
[73] Assignee: Alfred L. Burden, Victoria, Tex. ; a part interest
[22] Filed: Nov. 6, 1975
[21] Appl. No.: 629,534

[52] U.S. Cl. .......................................... 72/2; 74/612
[51] Int. Cl.² ....................... B21B 33/02; F16P 1/00
[58] Field of Search ..................... 72/2; 74/612, 616

[56] References Cited
UNITED STATES PATENTS
1,651,615  12/1927  Morin .................................. 74/612
3,498,217  3/1970  Kletti ................................ 74/612 X

*Primary Examiner*—Milton S. Mehr

[57] ABSTRACT

A guard is disclosed for guarding the nip between a pair of rolls in a power roll mill to prevent the mill operator's fingers from being crushed between the rolls. The guard comprises an upstanding plate pivotally mounted transversely between the opposite side frame members of the rolling mill in front of the pair of rolls being guarded. The top of the guard is flat and is located adjacent and below the normal path for the infeed of a sheet of material being formed between the rolls in order that an operator's fingers which support the underside of the sheet will engage the guard and be prevented from entering the roll nip. The guard plate is depressibly supported at its opposite ends by a pair of upright tubular rocker arms which are pivoted at their base and are biased to a central neutral position. At least one microswitch is provided adjacent one of the rocker arms which is in electric circuit with an electric motor which drives the power rolls to turn the motor on and off. An actuator for the switch projects into contact with the rocker arm and is actuated by pivotal movement of the rocker arm to either side of its neutral position in order to open the microswitch and thus to stop the electric motor.

8 Claims, 4 Drawing Figures

POWER ROLL MILL GUARDING DEVICE

The present invention relates to a guarding device for power roll mills to provide protection to an operator as he feeds the material to be rolled into the roll mill. The invention is particularly adapted for, but not limited to, use with powered "slip-type" roll mills in common use in sheet metal fabricating shops for rolling sheet metal into cylinders.

Various devices have been developed in the past to guard the nip between power driven rollers in order to protect an operator from the danger of crushing his fingers, hands and even his arms between the rolls. One such device is disclosed in U.S. Pat. No. 1,146,547 issued to Michael Bishop, July 13, 1915, which includes a pair of stationary guard plates positioned vertically in front of the roll nip and separated by a space through which the material to be formed is fed. This device has the disadvantage that it actually creates additional pinch points other than the nip between the rolls in which an operator's fingers can be caught and injured.

It is an object of the present invention to protect an operator from the pinch points between the rolls and to avoid creating additonal pinch points.

It is a further object of this invention to provide a guard for a power roll mill which is located entirely below the normal feed path of material being manually fed between the rolls. By so positioning the guard, no obstruction is provided which will hinder the removal of material from the roll mill once it has been formed into a cylinder, or which will limit the diameter of the circle into which the material can be rolled.

It is another object of this invention to provide a guarding device which has free vertical movement which allows for unevenness of the material entering the roll mill and prevents a pinch point since the guarding device of this invention is supported on springs.

It is another object of the invention to provide a pivoted guard which is biased to a normal neutral position and should the guard be moved more than a small set distance inward or outward of the machine from the neutral position, the machine will be completely stopped by microswitches located in the path of movement of the guarding device and in the control circuit for the electric motor driving the machine.

It is another object of this invention to mount the guarding device to the adjusting blocks at each end of the roll mill and as the adjustable roll is raised or lowered to allow for different thicknesses of material, the guarding device is raised or lowered with the roll so that guarding device is always in its proper position which is close to the underside of the material entering the roll mill.

BRIEF DESCRIPTION OF THE DRAWING

With the foregoing more important objects and features in view and such other objects and features which may become apparent as this specification proceeds, the invention will be understood from the following description taken in conjunction with the accompanying drawing, in which like characters of reference are used to designate like parts, and in which:

Referring now to the drawings, FIG. 2 shows a perspective view of the upper right-hand portion of a power roll mill 10 with the guarding device 22 of this invention mounted in front of the mill rolls 11, 12 and 13 of a three roll set seen more clearly in FIGS. 1 and 4. The power roll mill 10 includes a frame having upright end members 14 (only one shown) at the opposite ends of the rolls 11, 12 and 13, and bearings in the end members 14 for rotatably supporting the shafts of the rolls. Only one bearing 15 which supports the shaft 16 of the uppermost roll 11 is shown in FIG. 2. The lower roll 12 is adjustable with respect to the upper roll 11 in order to vary the gap between the two rolls by means of a knob 17 which the operator turns to rotate a screw 18 in the cylindrical nut 19 affixed to the end member 14. The screw 18 is connected to and moves an adjusting block 20 for the lower roll 12 toward or away from the upper roll 11, depending upon the direction in which the knob 17 is turned. The frame further includes a box-like housing 21 interconnecting the end members 14. While only the right-hand portion of the power roll mill 10 and of the guarding device 22 is shown, it will be understood that the left hand portion of the power roll mill 10 includes a left-hand upright end member and bearings for supporting the left-hand ends of the rolls 11, 12, and 13. A left-hand knob, screw, cylindrical nut and a slidable adjusting block are mounted on the left-hand end member similar to corresponding elements 17, 18, 19 and 20 respectively shown in FIG. 4. Power means (not shown) but including an electric motor and an appropriate drive train is provided at the left-hand side of the power roll mill 10 to drive the power rolls. The left-hand end of the guarding device 22 is similar to the right-hand end which is shown.

Figure 1:
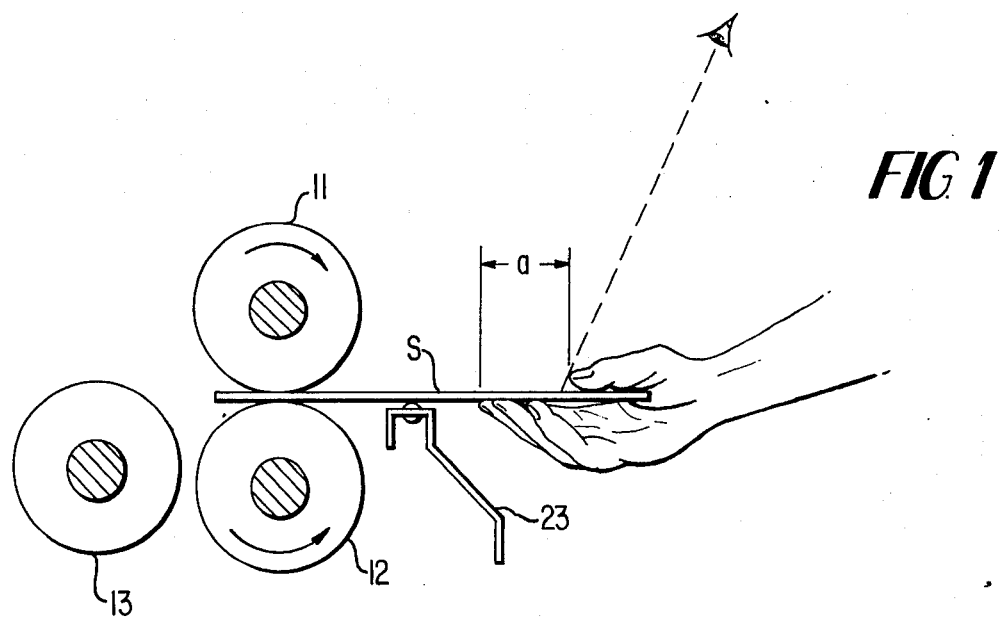
FIG. 1 is a transverse sectional view through the rolls of a power roll mill and through the hand protection bar, or guard plate of this invention showing diagrammatically a piece of sheet material being fed into the roll mill and the usual position of an operator's hand in supporting the sheet as it is fed into the machine.

The power roll mill 10 is typical of power roll mills commonly used in forming sheet metal, flat bar, and round stock into pipes, rings, flanges, and other articles. One such mill is a Niagara roll mill manufactured by Niagara Machine and Tool Works. The invention, however, is not limited to use with a particular roll mill and it can be mounted on various types of apparatus which include a pair of cooperating power rolls.

The guarding device 22 comprises an elongated hand protecting bar, or guard plate 23 extending in front of and parallel to the power rolls 11 and 12 and between them a pair of side plates 24 (only one shown) which are parallel to the end frame members 14. The side plates 24 have short angle iron sections 25, welded perpendicular to the inner face 27 of the side plate 24. The webs of the angle iron sections are positioned over an upper corner of the adjustable block 20 and are bolted to the block by bolts 28 extending through apertures 26 in angle iron sections 25.

The hand protection bar 23 includes a pair of horizontally offset upright web portions 29 and 30, an inclined web portion 31 interconnecting the web portions 29 and 30, a flat top web portion 32 extending toward the power rolls, and a downwardly depending flange 33. A pull bar 35 is attached to the uppermost upright portion 30 and a depress bar 36 is attached to the lowermost web portion 29 of the hand protection bar. A pair of horizontal bracket arms 37 (only one shown) are welded to the inclined web portion 33 near the ends thereof and opposite the power rolls. At the outer end of each of the bracket arms 37 is affixed a cylindrical socket 38 having a connection pin 39 mounted therein and depending coaxially from the inside of the closed end 40 and projecting downwardly from the outwardly flared open end 41.

Figure 3:
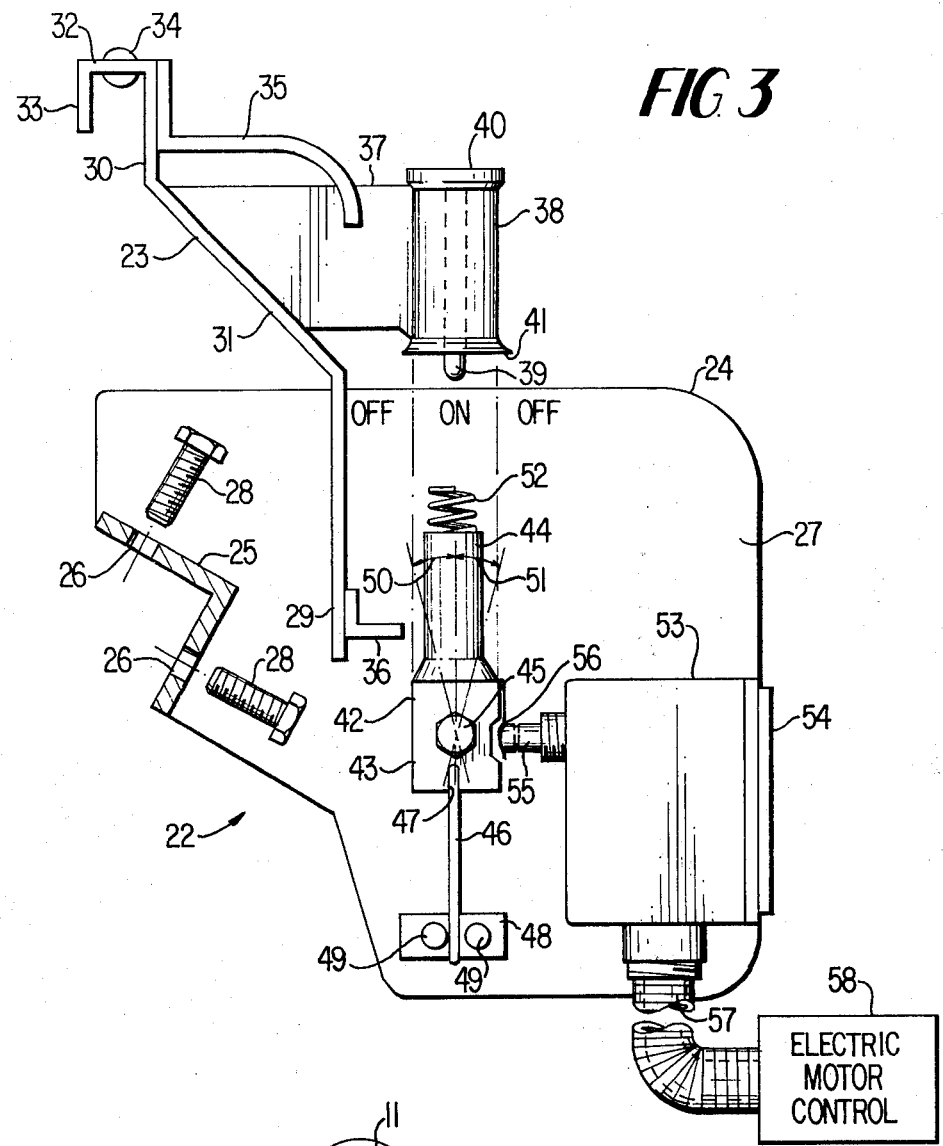
FIG. 3 is an exploded sectional view of the guarding device taken on line 3—3 of FIG. 2.
Figure 4:
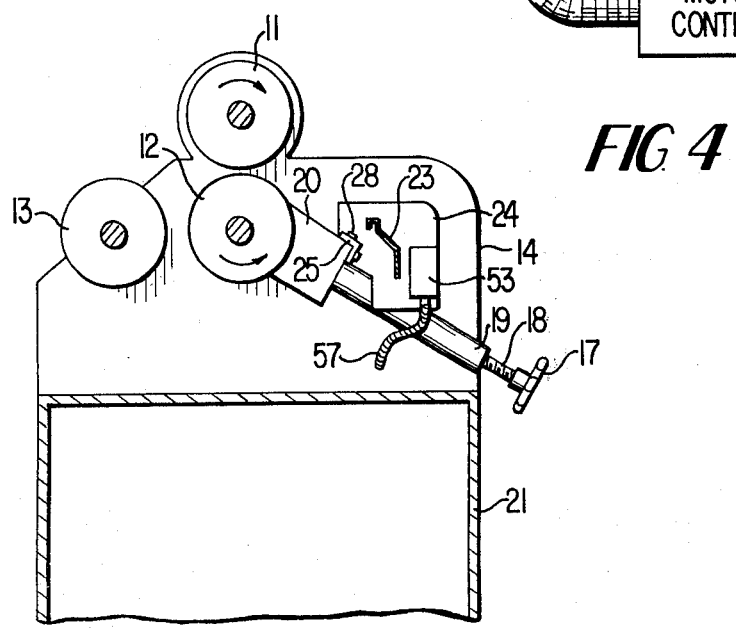
FIG. 4 is a transverse sectional view taken on line 4—4 of FIG. 2.

Rocker arms 42 (only one shown) each having a block-like base portion 43 and an upwardly open cylindrical portion 44 mounted on top of the base portion are pivotally mounted to the inside face 27 of each side plate 24 by means of a pivot bolt 45 extending centrally through the base portion 43 into the side plate 24. The rocker arm 42 is biased to a central neutral position as shown by means of a resilient tension bar 46 having one end seated in a vertical slot 47 formed in the bottom of the base portion 42. The other end of the tension bar 46 is held between spaced round members 49 secured to a tension bracket 48 which is affixed to the inside face 47 of the side plate 24. The rocker arm 44 is adapted to pivot toward and away from the power rolls 11 and 12 from the neutral position shown through the angles 50, 51 as seen in FIG. 3. The tension bar 46 will automatically return the rocker arm to its neutral position when outside turning forces acting thereon are removed.

The bracket arm cylindrical socket 38 is normally telescoped over the cylindrical portion 44 of the rocker arm 42 with the connection pin telescoped inside of the cylindrical portion 44. A compression spring 52, seated inside the cylindrical portion 44 functions to keep the socket 38 raised above its fully telescoped position with respect to the rocker arm cylinder 44 and permits vertical movement of the bracket arm 37 and the hand protection bar 23.

A microswitch 53 is mounted outwardly of the rocker arm 42 by means of a microswitch mounting bracket 54 which extends perpendicularly from the side plate 24. The microswitch 53 has an actuator plunger 55 reciprocally mounted therein for opening and closing the switch. The plunger 55 engages a recess 56 in one side of the rocker arm block portion 43. The axis of the plunger 56 would intersect the axis of the pivot bolt 45 if extended. In the neutral position of the rocker arm as shown in FIG. 3, the microswitch plunger is extended and the microswitch is closed. Movement of the rocker arm 42 through selected angles 50 and 51 will depress the plunger 55 and open the microswitch 53. The microswitch 53 is connected in electrical circuit with an appropriate electrical motor control 58 for the power roll mill by means of electrical conduit 57 for stopping the electric motor driving the power roll mill when the hand protection bar 23 is moved a set distance toward or away from the power rolls. A removable cover (seen in FIG. 2) for the microswitch 54, rocker arm 52 and bracket arm 37 is lifted from its normal covering position to expose the normally concealed parts.

Figure 2:
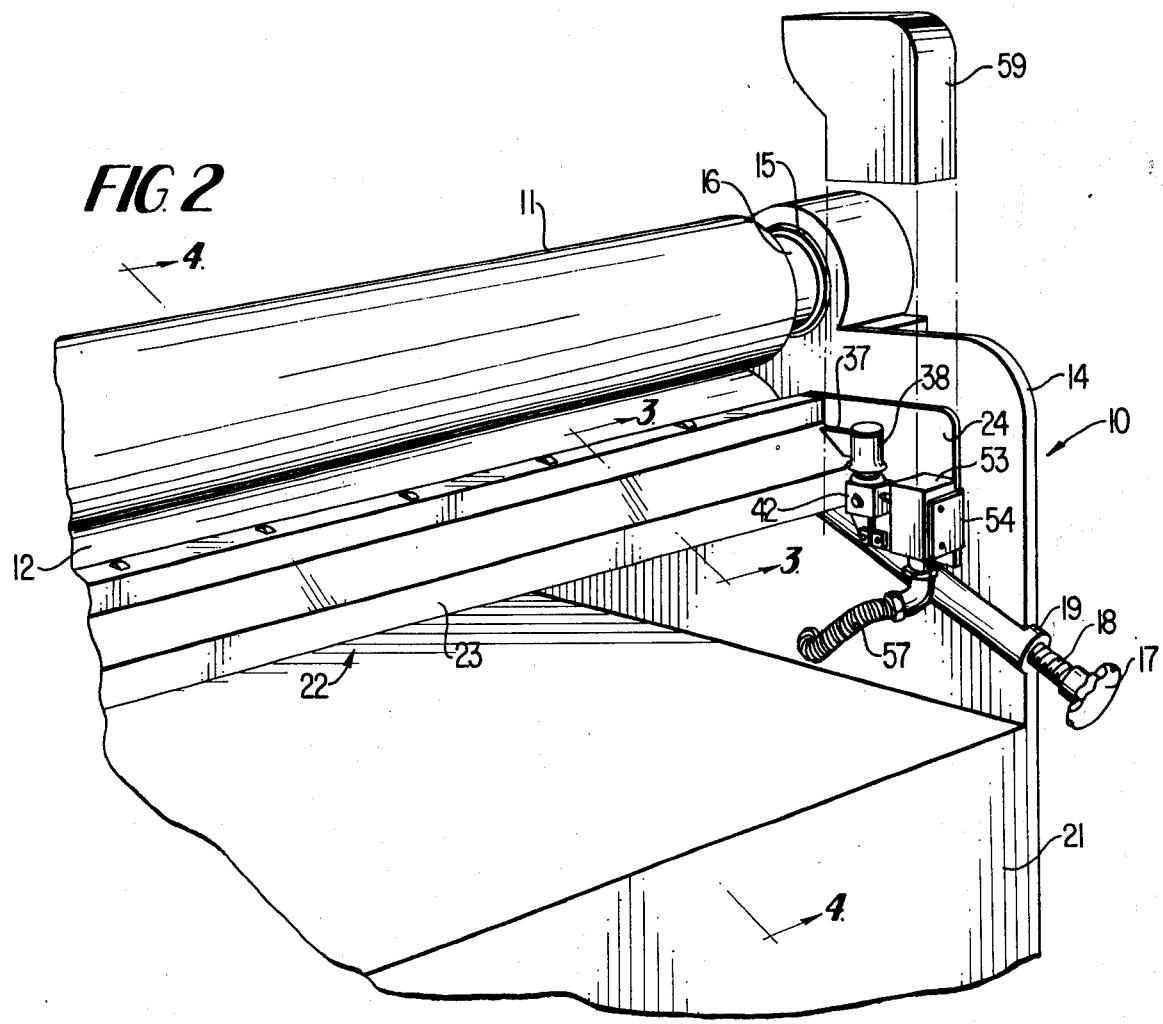
FIG. 2 is a partial front perspective view of the upper right-hand portion of a power roll mill with the guarding device of this invention mounted thereon.

FIG. 1 illustrates the situation which often exists as an operator starts a sheet of metal S into the roll mill. The operator sees the part of his hand which is above the metal and would possibly remove his hand before that part enters the danger area, but the part of his hand which is under the sheet S may have already entered the danger area and may be caught between the metal and the rolls 11 and 12 before the operator is aware of the danger. FIG. 1 also shows the roll mill guard positioned a safe distance in front of rolls 11 and 12 and is attached to each end of the roll mill 10 on spring loaded rocker arms 42 for support. It is also positioned under the material entering the roll in such a way that the part of the hand under the metal S will come in contact with the guard at a safe distance from the danger area. As the fingers touch the guard plate 23 the operator will be warned of the approaching danger and will remove his hand before an injury occurs. It will also be noted that all parts of the guarding system are below the working area and therefore do not interfere with normal operations of the machine. If the operator should fail to remove his hand after his fingers touch the guard, the guard plate 23 will be moved toward the rolls 11 and 12. The distance which the guard is allowed to move either toward the rolls or away is controlled gy microswitches 53 located at each end of the guard plate 23 and under the switch covers 58 as shown in FIG. 2. Movement of the guard plate 23 either toward the rolls or in the opposite direction more than the adjusted distance causes the formed side of the rocker arm 42 to move the plunger 55 of the microswitch 53, breaking the control circuit 57 and stopping the entire operation of the roll mill until the guard plate 23 is returned to its normal center position as shown in FIG. 2. This quick stopping action is particularly important in the event of a person falling against the roll mill while it is in operation. The machine would automatically stop when any part of his body strikes the guarding device 22.

This guarding device can work equally as well on hand powered roll mills where no electrical switches can stop the machine. This stopping action can be accomplished by arranging small wedges to be pressed between rolls 11 and 12 as the guard plate 23 is moved toward the rolls 11 and 12 more than an allowable distance.

The rollers 34 which are rotatably mounted in the top web 32 of the guard plate 23 eliminate sheet metal drag as a sheet is fed into the roll mill 10.

The pull bar 35 permits an operator to grasp the bar and return the guard plate to its normal neutral position to allow restarting of the machine after automatic shut off.

The depress bar 36 permits an operator to force the guard plate down out of the path of metal sheets of unusual thickness being fed into the power roll mill.

In the preferred embodiment of this invention there are two microswitches 53 provided, one located on each side of the power roll machine in the manner shown in FIG. 2. The two microswitches would be connected in circuit with electric motor control 58 so that the opening of either microswitch would stop the machine.

While in the foregoing there has been described and shown a preferred embodiment of the invention, various modifications and equivalents may be resorted to within the spirit and scope of the invention as claimed.

What is claimed is:

1. A guarding device for a roll mill having a pair of parallel, superimposed, counter rotating driven rolls forming a nip between the rolls comprising an elongated guard plate spaced in front of and substantially parallel and coextensive in length with the lower most of said rolls, means for pivotally supporting said guard plate to move toward and away from a neutral position, resilient means biasing said guard plate to said neutral position, and means for stopping said rolls responsive to the pivotal movement of said guard plate a pre-set distance away from said neutral position, said guard plate having a top edge which is normally positioned adjacent the level of the nip between said rolls, said means for pivotally supporting said guard plate including resilient means for normally holding the top edge of said guard plate adjacent the level of said nip and for allowing said plate to be depressed downwardly from the level of said nip.

2. The guarding device according to claim 1 wherein said guard plate includes a flat top surface having rollers rotatably mounted in said surface to provide antifriction support for material being fed into said roll mill.

3. The guarding device according to claim 1 together with a depress bar affixed to said guard plate for manual depression of said guard plate.

4. The guarding device according to claim 1 wherein said rolls of said roll mill are driven by an electric motor having an electric control circuit, and wherein said means for stopping said rolls comprises at least one microswitch in said control circuit for turning said motor on and off, said microswitch having an actuator for sensing the position of said guard plate and being normally turned on when said guard plate is in its neutral position and being turned off when said guard plate is pivoted said preset distance from said neutral position.

5. The guarding device according to claim 1 wherein said lowermost roll of said roll mill is adjustably mounted to move toward and away from the uppermost roll of said roll pair to vary the gap there-between, adjustment blocks at each end of said lowermost roll for moving said lowermost roll, and means for moving said adjustment blocks, said means for pivotally supporting said guard plate including a pair of side plates, one of said side plates being affixed to one of said adjustment blocks and the other side plates being affixed to the other adjustment block, a pair of upright rocker arms having a base portion, and an upper portion, pivot means for connecting the base portion of one rocker arm to one side plate, pivot means for connecting the base portion of the other rocker arm to the other side plate, and bracket means at opposite end of said guard plate for mounting said guard plate on said rocker arms.

6. The guarding device according to claim 5 wherein said resilient means for normally holding the top edge of said guard plate adjacent the level of said nip includes compression springs interposed between said bracket arms and the upper portion of said rocker arms for yieldably mounting said bracket means over said rocker arms.

7. The guarding device according to claim 6 wherein each of said bracket means has a downwardly open socket affixed thereto, and the upper portion of each rocker arm is a hollow cylinder telescoped within one of said downwardly open sockets, there being one of said compression springs seated in each of said hollow cylinders and normally keeping said downwardly open socket from being fully telescoped over said hollow cylinder.

8. The guarding device according to claim 7 wherein said means for biasing said guard plate to a neutral position includes resilient tension bars operatively connected between each of said rocker arms and tension bar support fixtures on the respective side plates.

* * * * *